United States Patent
Andou (10) Patent No.: US 8,794,279 B2
(45) Date of Patent: Aug. 5, 2014

(54) PNEUMATIC TIRE WITH TREAD INCLUDING THIN GROOVE HAVING ROUNDED CORNER PORTIONS

(75) Inventor: Shuji Andou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 829 days.

(21) Appl. No.: 12/530,725

(22) PCT Filed: Mar. 11, 2008

(86) PCT No.: PCT/JP2008/054367
§ 371 (c)(1),
(2), (4) Date: Sep. 10, 2009

(87) PCT Pub. No.: WO2008/111582
PCT Pub. Date: Sep. 18, 2008

(65) Prior Publication Data
US 2010/0116395 A1    May 13, 2010

(30) Foreign Application Priority Data

Mar. 13, 2007   (JP) ................................. 2007-063560

(51) Int. Cl.
*B60C 11/13*    (2006.01)
(52) U.S. Cl.
CPC ..... *B60C 11/1323* (2013.04); *B60C 2011/0348* (2013.04)
USPC .................. 152/209.21; 152/209.27
(58) Field of Classification Search
CPC ................... B60C 11/1323; B60C 2011/0348
USPC ........................ 152/209.21, 209.27
See application file for complete search history.

(56) References Cited

U.S. PATENT DOCUMENTS 5,323,825 A    6/1994   Yamagishi et al.

FOREIGN PATENT DOCUMENTS

| JP | 11-301214 A | * 11/1999 |
| JP | 11-301214 A | 11/1999 |

(Continued)

OTHER PUBLICATIONS

Machine translation for Japan 2001-206015 (no date).*

(Continued)

*Primary Examiner* — Steven D Maki
(74) *Attorney, Agent, or Firm* — Sughrue Mion, PLLC (57) ABSTRACT

A thin groove 4 that continuously extends in the tread circumferential direction is provided in a shoulder rib 3. An annular groove 8 continuous in the circumferential direction is provided in a groove wall 4a on the tread equatorial surface side of the thin groove 4 to be contiguous to the groove bottom, in a cross section taken in the width direction of the tread. The shape of the annular groove in a cross section taken in the width direction of the tread is formed such that a corner portion contiguous to the groove wall on the tread equatorial surface side is rounded to a curvature radius R1, a corner portion of the innermost portion of the annular groove that is in the outer side portion in the tire radial direction is rounded to a curvature radius R2, a corner portion of the innermost portion of the annular groove that is in the inner side portion in the tire radial direction is rounded to a curvature radius R3, and a corner portion contiguous to a groove wall 4b on the tread end side is rounded to a curvature radius R4. According to the present invention, it is possible to improve the stone trapping resistance, tear resistance of defense grooves, and groove bottom crack resistance.

6 Claims, 5 Drawing Sheets

(56) References Cited

FOREIGN PATENT DOCUMENTS

| JP | 2001-206015 | A | * | 7/2001 |
|----|-------------|---|---|--------|
| JP | 2001-206015 | A |   | 7/2001 |
| JP | 2001-260612 | A |   | 9/2001 |
| JP | 2002-079809 | A |   | 3/2002 |
| JP | 2007-253875 | A |   | 10/2007 |

OTHER PUBLICATIONS

Machine translation for Japan 11-301214 (no date).*
Supplementary European Search Report issued in European Application No. 08721783.2-2425 / 2127906 dated Nov. 19, 2010.*
International Search Report of PCT/JP2008/054367 dated May 20, 2008.

* cited by examiner

PNEUMATIC TIRE WITH TREAD INCLUDING THIN GROOVE HAVING ROUNDED CORNER PORTIONS

TECHNICAL FIELD

The present invention relates to a pneumatic tire that, by providing a thin groove that continuously extends in the circumferential direction in a shoulder rib that is demarcated by a circumferential direction main groove, prevents eccentric wear that starts to appear on the outer edge of the shoulder rib from developing so as to spread to the entire shoulder rib, and is favorably used in trucks, buses and the like.

Priority is claimed on Japanese Patent Application Publication No. 2007-063560, filed Mar. 13, 2007, the content of which is incorporated herein by reference.

BACKGROUND ART

Conventionally in general terms, a thin groove called a defense groove that continues in a straight line in the tread circumferential direction is provided in a shoulder rib, and by this thin groove, preventing the progress of eccentric wear over the entire shoulder rib, and eventually, the spreading of that eccentric wear to the rib on the side of the tread center is prevented from occurring.

In addition to the thin groove that has this function, there is also known one that moreover provides an annular groove that is continuous in the circumferential direction in a groove wall of this thin groove that is on the tread equatorial surface side to be contiguous to the groove bottom (for example, refer to Patent Document 1, FIG. 6(b)).

In a pneumatic tire that also provides an annular groove at the groove bottom of the thin groove in this way, it is of course possible to confine eccentric wear to the tread edge side portion from the thin groove, and in addition, due to eccentric wear that is confined to the tread edge side portion, when the tire subsequently undergoes load rolling, even in the case of the remainder of the shoulder rib (the tread center side portion that does not receive the eccentric wear) deforming greatly to the inner circumferential side in the tire radius direction compared to the tread edge side portion, it is possible to relieve the concentration of strain at the groove bottom of the thin groove by the annular groove, and thereby the advantage is obtained of being able to suppress the occurrence of cracking or the like at the groove bottom of the thin groove.

[Patent Document 1] Japanese Unexamined Patent Application, First Publication No. H11-301214

DISCLOSURE OF THE INVENTION

Problem to be Solved by the Invention

Apart from that, in the pneumatic tire also provided with an annular groove at the groove bottom of the thin groove disclosed in Patent Document 1, although the abovementioned advantage is obtained, in the case of widening the width of the annular groove, the following problem was newly uncovered.

Figure 7:
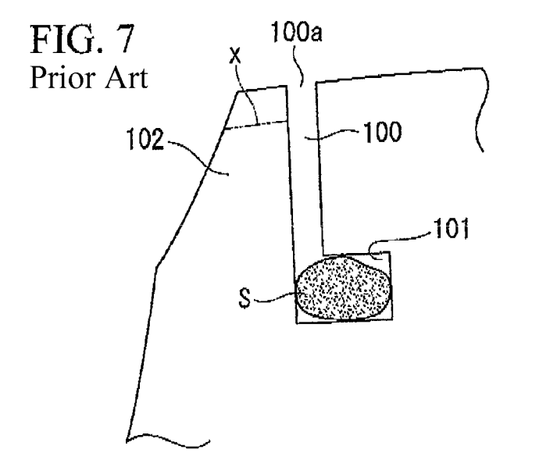
FIG. 7 is a cross-sectional view that describes a problematic point of conventional pneumatic tires.

That is, as shown in FIG. 7, a stone S that has intruded from an opening portion 100a of the thin groove 100 comes to be held in the annular groove 101, and when this stone moves in the circumferential direction along the annular groove 101, the problem arises of it damaging the wall portion of the annular groove, that is, the problem arises as a result of the stone being easily trapped.

Note that double dotted and dashed line X in FIG. 7 shows a step portion at which shoulder drop has locally occurred at the tread edge side portion 102 of the shoulder rib due to progression of eccentric wear. In this way, due to the presence of the thin groove 100, the eccentric wear stops at the tread edge side portion 102. Regarding the step portion expressed by this double dotted and dashed line X, the same applies to the following FIG. 8 to FIG. 10 and FIG. 1.

Figure 8:
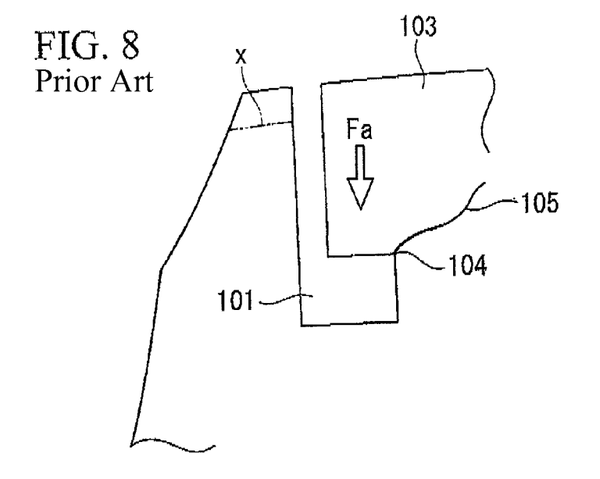
FIG. 8 is a cross-sectional view that describes a problematic point of conventional pneumatic tires.

Also, as shown in FIG. 8, in the event of a large load Fa being applied to the tread center side portion 103 of the shoulder rib such as when the pneumatic tire runs for example onto a curb, there has been the problem of a tear 105 occurring from corner portion 104 of the innermost portion of the annular groove 101 that is in the outer side portion in the tire radial direction.

Figure 9:
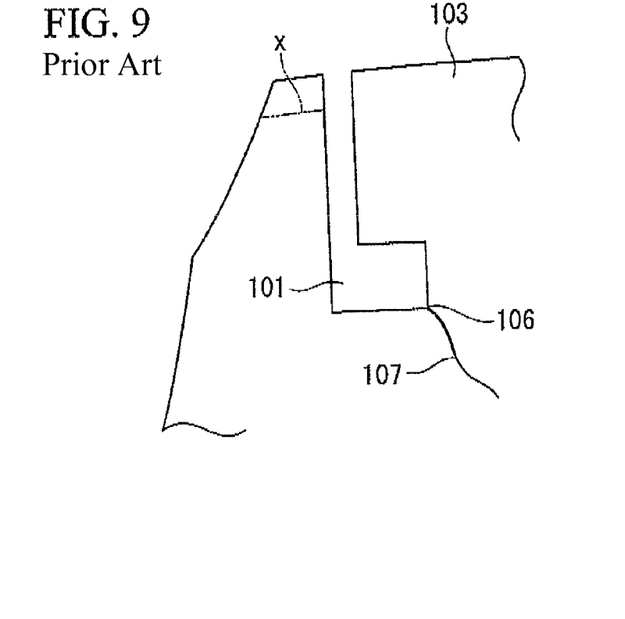
FIG. 9 is a cross-sectional view that describes a problematic point of conventional pneumatic tires.

Also, as shown in FIG. 9, when using a pneumatic tire over a long period, with repeated deformation with respect to the annular groove 101, there has been the problem of a wrinkle occurring in the corner portion 106 of the inner side portion in the tire radial direction of the innermost portion of the annular groove 101, and this wrinkle developing into a crack 107, that is, there has been the problem of groove bottom cracking easily occurring.

Figure 10:
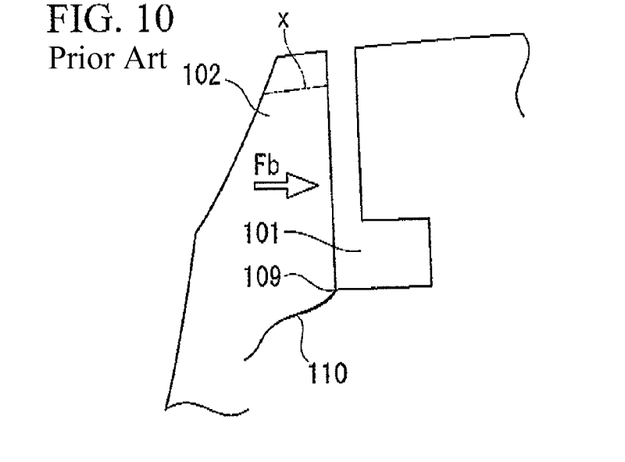
FIG. 10 is a cross-sectional view that describes a problematic point of conventional pneumatic tires.

Also, as shown in FIG. 10, when a lateral load acts on the pneumatic tire, and a large load Fb is applied to the tread edge side portion 102, there has been the problem of a tear 110 being generated from a corner portion 109 that is contiguous to the tread edge side groove wall of the annular groove 101, that is, along with the problem shown in FIG. 8, there has been the problem of a defense groove tear easily occurring.

The present invention was achieved in view of the above circumstances, and has as its object to improve the stone trapping resistance, tear resistance of defense grooves, and groove bottom crack resistance in a pneumatic tire that provides a thin groove in a shoulder rib.

Means for Solving the Problem

The present invention adopts the following apparatus in order to solve the aforementioned issues.

The pneumatic tire according to a first aspect of the present invention is a pneumatic tire in which a thin groove that continuously extends in the tread circumferential direction is provided in a shoulder rib that is demarcated to the tread edge side portion by a circumferential direction main groove that is continuous in the tread circumferential direction, the pneumatic tire includes an annular groove provided continuously in the circumferential direction in a groove wall on the tread equatorial surface side of the thin groove, which is formed facing the normal direction of the tread surface, to be contiguous to the groove bottom in a cross section taken in the width direction of the tread, in which the shape of the annular groove in a cross section taken in the width direction of the tread is formed such that a corner portion contiguous to the groove wall on the tread equatorial surface side is rounded to a curvature radius R1, a corner portion of the innermost portion of the annular groove that is in the outer side portion in the tire radial direction is rounded to a curvature radius R2, a corner portion of the innermost portion of the annular groove that is in the inner side portion in the tire radial direction is rounded to a curvature radius R3, and a corner portion contiguous to a groove wall on the tread end side is rounded to a curvature radius R4.

According to the pneumatic tire in accordance with the first aspect of the present invention, for example, even if a stone intrudes into the annular groove, because the corner portion of the annular groove 8 that is contiguous to the groove wall of the tread equatorial surface side is rounded to a curvature radius R1, the stone that has intruded is hindered from becoming caught on this rounded portion. For this reason, a stone that has once intruded is quickly discharged to the opening side of the thin groove through this portion without becoming caught on the rounded corner portion when the annular groove deforms due to a load being applied to the tire. That is, it is possible to quickly discharge to the outside a foreign object such as a stone that has once intruded into the thin groove. As a result, it is possible to prevent the situation of a stone that has intruded into the annular groove from stopping as is and moving along the inside of the annular groove, thereby causing damage to the groove walls.

Also, since the corner portion of the innermost portion of the annular groove that is in the outer side portion in the tire radial direction has a roundness of curvature radius R2, even in the case of a large load being applied to the tread center side portion of the shoulder rib as a result of the pneumatic tire, for example, running onto a curb, stress is hindered from concentrating in the vicinity of the rounded corner. Therefore, it is possible to avoid a tear occurring from the rounded corner portion of the rounded corner.

Also, since the corner portion of the innermost portion of the annular groove that is in the inner side portion in the tire radial direction has a roundness of curvature radius R3, even in the case of repeated deformation occurring in the innermost portion of the annular groove, stress is hindered from concentrating in the vicinity of the corner portion of the inner side portion in the tire radial direction of the groove bottom of the annular groove. Therefore, it is possible to avoid the occurrence of a crack from the rounded corner portion with the curvature radius R3.

Also, since the corner portion contiguous to the groove wall of the tread edge side has a roundness of curvature radius R4, even in the case of a large lateral load being applied to the tread edge side portion, stress is hindered from concentrating in the vicinity of the rounded corner contiguous to the groove wall of the tread edge side. Therefore, tearing is hindered from occurring from the rounded corner portion.

That is, the stone trapping resistance, tear resistance of defense grooves, and groove bottom crack resistance respectively improve.

A pneumatic tire according to a second aspect of the present invention is the pneumatic tire which further includes a straight portion or a curved portion having a curvature radius that differs from the curvature radii of the corner portions interposed between the corner portions.

With this characteristic, it is possible to set the curvature radii of the corner portions to suitable values.

A pneumatic tire according to a third aspect of the present invention is the pneumatic tire in which the curvature radius R1 is set to a range of 1.0 mm to 12.0 mm, the curvature radius R2 is set to a range of 1.5 mm to 4.0 mm, the curvature radius R3 is set to a range of 1.0 mm to 6.0 mm, and the curvature radius R4 is set to a range of 2.0 mm to 16.0 mm.

Since the curvature radius of each corner portion is set to a suitable value in this way, the stone trapping resistance, tear resistance of defense grooves, and groove bottom crack resistance are further enhanced.

A pneumatic tire according to a fourth aspect of the present invention is the pneumatic tire in which the width of the annular groove measured from the groove wall on the tread equatorial surface side in a cross section taken in the tread width direction is set to a range of 1 to 5 times the width of the thin groove.

By setting the width of the annular groove in this way, along with reducing the contact pressure of the tread center side portion of the shoulder rib, it is possible to favorably suppress the progression of eccentric wear, and it is possible to prevent the occurrence of tearing and cracking from the innermost portion of the annular groove.

A pneumatic tire according to a fifth aspect of the present invention is the pneumatic tire in which the depth of the thin groove is in a range of 0.3 to 1.5 times the depth of the circumferential direction main groove, and the width of the thin groove is in a range of 0.3 mm to 5.0 mm.

Since the depth and width of the thin groove are prescribed in this way, it is possible to further enhance the effect of suppressing progression of eccentric wear and the effect of preventing the occurrence of tearing and cracking.

Effect of the Invention

According to the present invention, in a pneumatic tire that provides a thin groove in the shoulder rib, because the corner portions are rounded at required locations, the stone trapping resistance improves by quickly extracting stones that have intruded into the thin groove, and since it is possible to avoid the stress concentrating at each location, the tear resistance of defense grooves and groove bottom crack resistance are respectively improved.

| [DESCRIPTION OF REFERENCE NUMERALS] | |
|---|---|
| 1 | tread surface portion |
| 2 | circumferential direction main groove |
| 3 | shoulder rib |
| 4 | thin groove |
| 4a | groove wall on tread equatorial surface side |
| 4b | groove wall on tread edge side |
| 5 | tread center side portion of shoulder rib |
| 6 | tread edge side portion of shoulder rib |
| 8 | annular groove |

BEST MODE FOR CARRYING OUT THE INVENTION

Figure 1:
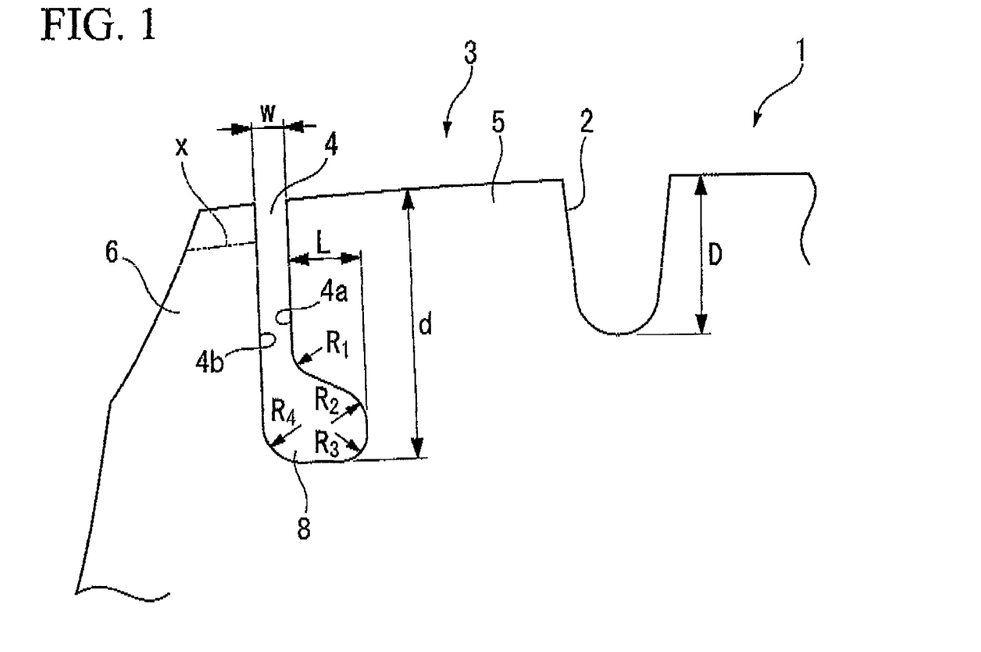
FIG. 1 is a perspective view of the essential portions showing the pneumatic tire of the embodiment of the present invention.

Hereinbelow, the embodiment of the pneumatic tire in accordance with the present invention shall be described with reference to the drawings. FIG. 1 is an essential portion cross-sectional view in the width direction of a tread showing the embodiment of the present invention.

Here, a circumferential direction main groove 2 that continuously extends in the tread circumferential direction is provided in a tread surface portion 1, and a shoulder rib 3 is demarcated to the tread edge side portion by the circumferential direction main groove 2. In the cross section that is illustrated, one thin groove 4 that is formed facing the normal direction of the tread surface is continuously extended so as to form for example a linear shape or a zigzag shape in the tread circumferential direction in the portion near the outer edge of the shoulder rib 3.

Also, here the tread equatorial surface side from the thin groove 4 of the shoulder rib 3 (the right side in FIG. 1) is called the tread center side portion 5, and the tread edge side from the thin groove 4 of the shoulder rib 3 (the left side in FIG. 1) is called the tread edge side portion 6.

The depth d of this thin groove 4 is in a range of 0.3 to 1.5 times the depth D of the circumferential direction main groove 2, and the width w thereof is in a range of 0.3 to 5.0 mm.

In a cross-section taken in the tread width direction, an annular groove 8 that is continuous in the circumferential direction is provided in a groove wall 4a on the tread equatorial surface side that is contiguous to the groove bottom of the one thin groove 4 that is formed facing the normal direction of the tread surface.

The shape of the annular groove 8 in a cross section taken in the tread width direction is formed such that a corner portion contiguous to the groove wall 4a on the tread equatorial surface side is rounded to a curvature radius R1, a corner portion of the innermost portion of the annular groove 8 that is in the outer side portion in the tire radial direction is rounded to a curvature radius R2, a corner portion of the innermost portion of the annular groove 8 that is in the inner side portion in the tire radial direction is rounded to a curvature radius R3, and a corner portion contiguous to the groove wall 4b on the tread edge side is rounded to a curvature radius R4.

Here, the curvature radius R1 is set to a range of 1.0 mm to 12.0 mm, the curvature radius R2 is set to a range of 1.5 mm to 4.0 mm, the curvature radius R3 is set to a range of 1.0 mm to 6.0 mm, and the curvature radius R4 is set to a range of 2.0 mm to 16.0 mm.

Also, the width L of the annular groove 8 measured from the groove wall 4a on the tread equatorial surface side in cross section in the tread width direction is set to a range of 1 to 5 times the width w of the thin groove.

The action of the pneumatic tire of this constitution shall be described.

In the aforementioned pneumatic tire, since the thin groove 4 that continuously extends in the tread circumferential direction is provided in the shoulder rib 3, it is possible to confine eccentric wear that starts to appear on the outer end edge of the shoulder rib 3 to the tread edge side portion 6 on the outer side from the thin groove 4.

Also, the annular groove 8 that is continuous in the circumferential direction is provided in the groove wall 4a on the tread equatorial surface side to be contiguous to the groove bottom of the thin groove 4. Accordingly, due to eccentric wear that is confined to the tread edge side portion 6, when the tire subsequently undergoes load rolling, even in the case of the remainder of the shoulder rib 3 (the tread center side portion 5 that does not receive the eccentric wear) deforming greatly to the inner circumferential side in the tire radial direction compared to the tread edge side portion 6, it is possible to relieve the concentration of strain at the groove bottom of the thin groove 4 by the annular groove 8. Therefore, it is possible to suppress the occurrence of cracking and the like at the groove bottom of the thin groove 4.

Also, for example, even if a stone intrudes into the annular groove 8 through the thin groove 4, because the corner portion of the annular groove 8 that is contiguous to the groove wall 4a of the tread equatorial surface side is rounded to a curvature radius 121, the stone that has intruded is hindered from becoming caught on this rounded portion. For this reason, a stone that has once intruded is quickly discharged to the opening side of the thin groove 4 through this portion without becoming caught on the rounded corner portion when the annular groove 8 deforms due to a load being applied to the tire. That is, it is possible to quickly discharge to the outside a foreign object such as a stone that has once intruded into the thin groove 4. As a result, it is possible to prevent the situation of a stone that has intruded into the annular groove 8 from stopping as is and moving along the inside of the annular groove 8, thereby causing damage to the groove walls 4a and 4b.

Figure 2:
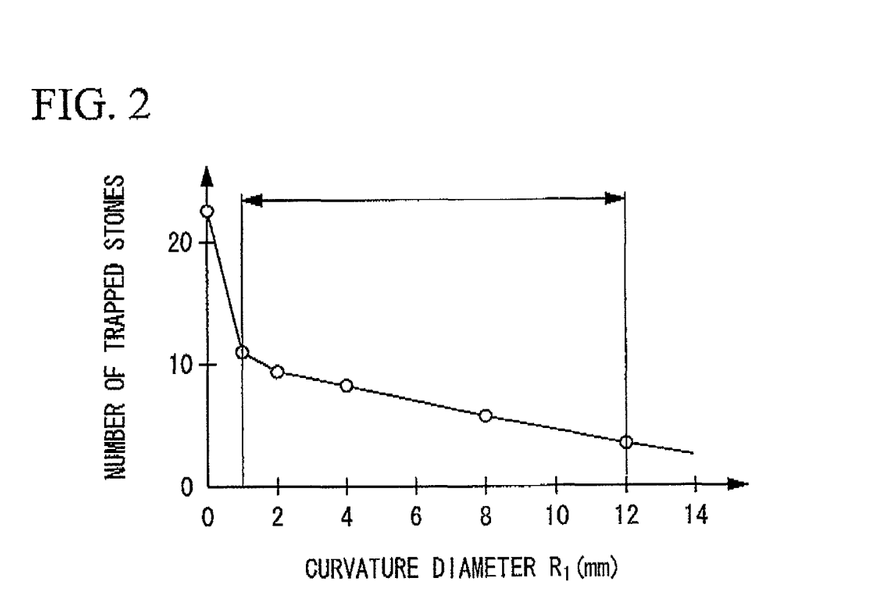
FIG. 2 is a drawing that shows the situation of the stone trapping resistance of the pneumatic tire in accordance with the present invention.

In particular, here the curvature radius R1 is set to a range of 1.0 mm to 12.0 mm, and as evident from FIG. 2, when the curvature radius R1 is set to 1.0 mm, it is evident that the number of trapped stones decreases to 11.

Note that FIG. 2 shows the state of trapped stones in the annular groove 8 when the curvature radius R1 is variously changed while the curvature radius R2 is fixed to 2.5 mm, the curvature radius R3 to 2.5 mm, and the curvature radius R4 to 4.0 mm in a 295/75R225 tire. That is, in FIG. 2, the number of stones trapped in the annular groove 8 of a tire that has traveled 18,520 km (10,000 miles) is shown on the vertical axis, while the curvature radius R1 is shown on the horizontal axis.

As will be noted from this drawing, in the case of setting the curvature radius R1 to 0 mm, that is, leaving the corner portion as is without rounding, 22 stones are trapped, but when the curvature radius R1 is set to 1.0 mm, the number of trapped stones is seen to decrease to 11. While the stone trapping performance is improved the larger the curvature radius R1 is made, when the curvature radius R1 is set to a value exceeding 12.0 mm, it becomes difficult to set the other corner portions, for example, the curvature radius R2 of the corner portion of the innermost portion of the annular groove 8 that is in the outer side portion in the tire radial direction, and the curvature radius R3 of the corner portion of the innermost portion of the annular groove that is in the inner side portion in the tire radial direction, to desired values. From this point, it is preferable to set the curvature radius R1 for the corner portion that is contiguous to the groove wall 4a of the tread equatorial surface side to 1.0 mm to 12.0 mm.

Also, since the corner portion of the innermost portion of the annular groove 8 that is in the outer side portion in the tire radial direction has a roundness of curvature radius R2, even in the case of a large load being applied to the tread center side portion 5 of the shoulder rib 3 as a result of the pneumatic tire, for example, running onto a curb, stress is hindered from concentrating in the vicinity of the rounded corner. Therefore, it is possible to avoid the occurrence of a tear from the rounded corner portion with the curvature radius R2.

Figure 3:
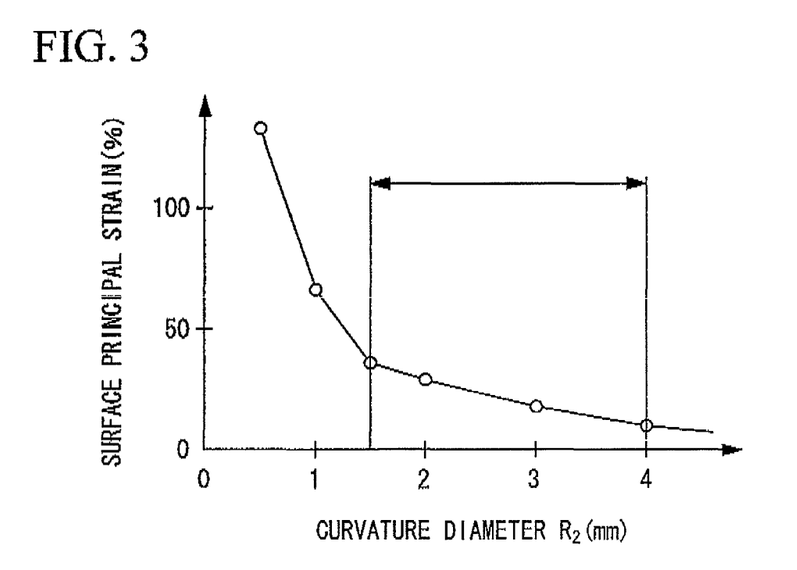
FIG. 3 is a drawing that shows the situation of tear resistance of defense grooves of the pneumatic tire in accordance with the present invention.

In particular, here the curvature radius R2 is set to a range of 1.5 mm to 4.0 mm, and as evident from FIG. 3, compared to the case of the curvature radius R2 being made less than 1.5 mm, it is evident that the tear resistance of defense grooves is improved.

Assuming the surface principal strain, found by the finite element method, that occurs when the curvature diameter R2 is set to 1.0 mm is 100 in a 295/75R225 tire with the curvature radius R1 fixed to 5.0 mm, the curvature radius R3 to 2.5 mm, and the curvature radius R4 to 4.0 mm, and under the conditions corresponding to an inner pressure of 690 kPa, load of 25.235 kN, and SF of 0.4 G, FIG. 3 shows changes in the same surface principal strain when the curvature radius R2 is variously changed. That is, in FIG. 3, the surface principal strain is taken along the vertical axis, and the radius of curvature R2 is taken along the horizontal axis.

As will be noted from this drawing, when the curvature radius R2 is 1.5 mm or more, the surface principal strain becomes smaller, and the tear resistance of defense grooves improves. When the curvature radius R2 is made large, although the tear resistance of defense grooves is improved by that much, when set to a value exceeding 4.0 mm, it becomes difficult to set the other corner portions, for example, the curvature radius R1 of the corner portion that is contiguous to the groove wall 4a of the tread equatorial surface side, and the curvature radius R3 of the corner portion of the innermost portion of the annular groove 8 that is in the inner side portion in the tire radial direction, to desired values. From this point, it is preferable to set the curvature radius R2 for the corner portion of the innermost portion of the annular groove 8 that is in the outer side portion in the tire radial direction to 1.5 mm to 4.0 mm.

Also, since the corner portion of the innermost portion of the annular groove 8 that is in the inner side portion in the tire radial direction has a roundness of curvature radius R3, even in the case of repeated deformation occurring in the innermost portion of the annular groove 8, stress is hindered from concentrating in the vicinity of the rounded corner portion. Therefore, it is possible to avoid the occurrence of a crack from the rounded corner portion with the curvature radius R3.

Figure 4:
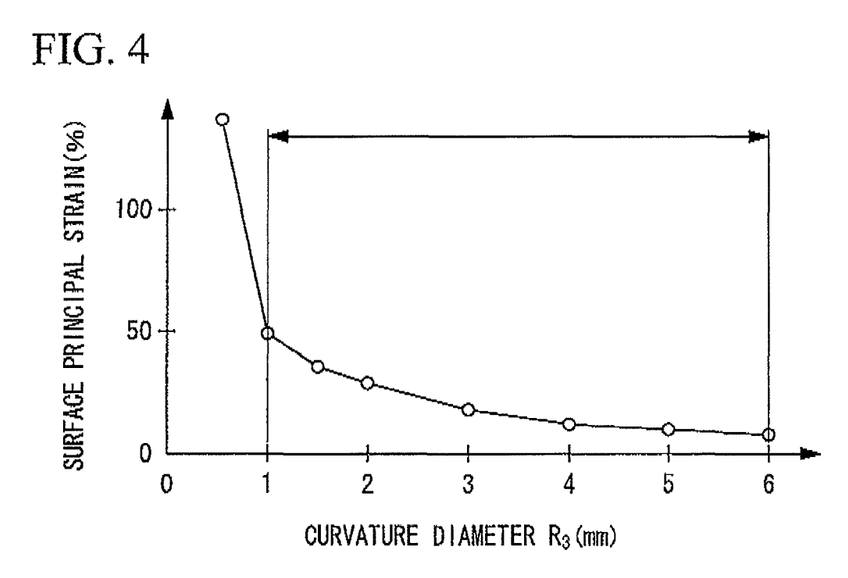
FIG. 4 is a drawing that shows the situation of groove bottom crack resistance of the pneumatic tire in accordance with the present invention.

In particular, here the curvature radius R3 is set to a range of 1.0 mm to 6.0 mm, and as evident from FIG. 4, compared to the case of the curvature radius R3 being made less than 1.0 mm, it is evident that the groove bottom crack resistance is improved.

Assuming the surface principal strain, found by the finite element method, that occurs when the curvature diameter R3 is set to 1.0 mm is 100 in a 295/75R225 tire with the curvature radius R1 fixed to 5.0 mm, the curvature radius R2 to 2.5 mm, and the curvature radius R4 to 4.0 mm, and under the conditions corresponding to an inner pressure of 690 kPa and load of 25.235 kN, FIG. 4 shows changes in the same surface principal strain when the curvature radius R3 is variously changed. That is, in FIG. 4, the surface principal strain is taken along the vertical axis, and the curvature radius R3 is taken along the horizontal axis.

As will be noted from this drawing, when the curvature radius R3 is 1.0 mm or more, the surface strain becomes smaller, and the groove bottom crack resistance improves. When the curvature radius R3 is made large, although the groove bottom crack resistance is improved by that much, when set to a value exceeding 5.0 mm, it becomes difficult to set the other corner portions, for example, the curvature radius R2 for the corner portion of the innermost portion of the annular groove 8 that is in the outer side portion in the tire radial direction, and the curvature radius R4 for the corner portion that is contiguous to the groove wall 4b on the tread edge side, to desired values. From this point, it is preferable to set the curvature radius R3 for the corner portion of the innermost portion of the annular groove 8 that is in the inner side portion in the tire radial direction to 1.0 mm to 6.0 mm.

Also, since the corner portion contiguous to the groove wall 4b on the tread edge side of the annular groove 8 has a roundness of curvature radius R4, even in the case of a large lateral load being applied to the tread edge side portion, stress is hindered from concentrating in the vicinity of the rounded corner. Therefore, it is possible to avoid the occurrence of a tear from the rounded corner portion with the curvature radius R4.

Figure 5:
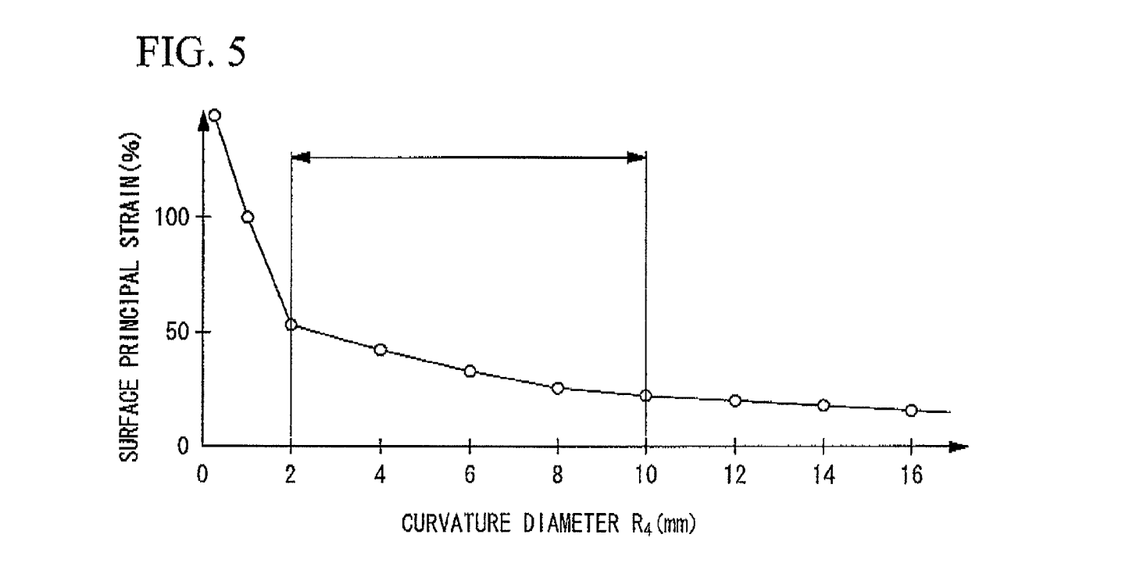
FIG. 5 is a drawing that shows the situation of tear resistance of defense grooves of the pneumatic tire in accordance with the present invention.

In particular, here the curvature radius R4 is set to a range of 2.0 mm to 16.0 mm, and as evident from FIG. 5, compared to the case of the curvature radius R4 being made less than 2.0 mm, it is evident that the tear resistance of defense grooves is improved.

Assuming the surface principal strain, found by the finite element method, that occurs when the curvature radius R4 is set to 1.0 mm is 100 in a 295/75R225 tire with the curvature radius R1 fixed to 5.0 mm, the curvature radius R2 to 2.5 mm, and the curvature radius R3 to 2.5 mm, and under the conditions corresponding to an inner pressure of 690 kPa, load of 25.235 kN, and SF of 0.4 G, FIG. 5 shows changes in the same surface principal strain when the curvature radius R4 is variously changed. That is, in FIG. 5, the surface principal strain is taken along the vertical axis, and the curvature radius R4 is taken along the horizontal axis.

As will be noted from this drawing, when the curvature radius R4 is 2.0 mm or more, the surface principal strain becomes smaller, and the tear resistance of defense grooves improves. When the curvature radius R4 is made large, although the tear resistance of defense grooves is improved by that much, when increased to an extent exceeding 12.0 mm, it becomes difficult to set the other corner portions, for example, the curvature radius R3 of the corner portion of the innermost portion of the annular groove 8 that is in the inner side portion in the tire radial direction, to desired values. From this point, it is preferable to set the curvature radius R4 of the corner portion that is contiguous to the groove wall 4b on the tread edge side of the annular groove 8 to 2.0 mm to 16.0 mm.

Moreover, in the pneumatic tire of this embodiment, the width L of the annular groove 8 measured from the groove wall 4a on the tread equatorial surface side in cross section in the tread width direction is set to a range of 1 to 5 times the width w of the thin groove 4. Accordingly, along with being able to reduce the contact pressure of the tread center side portion 5 of the shoulder rib 3, it is possible to favorably suppress the progression of eccentric wear. Also, it is possible to simultaneously prevent the occurrence of tearing and cracking from the innermost portion of the annular groove 8.

In particular, here the curvature radius R4 is set to a range of 2.0 mm to 16.0 mm, and as evident from FIG. 5, compared to the case of the curvature radius R4 being made less than 2.0 mm, it is understood that the tear resistance of defense grooves is improved.

Figure 6:
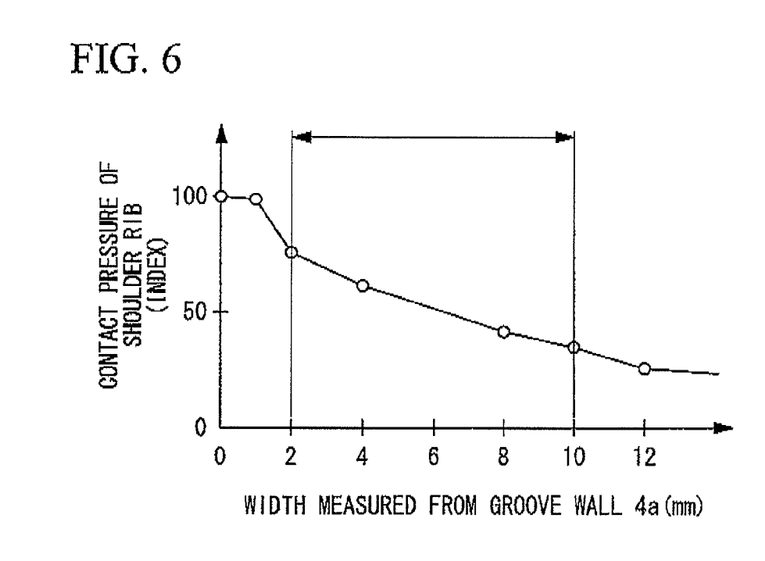
FIG. 6 is a drawing that shows the situation of eccentric wear suppression of the pneumatic tire in accordance with the present invention.

In a 295/75R225 tire with the curvature diameter R1 set to 5.0 mm, the curvature radius R2 to 2.5 mm, the curvature radius R3 to 2.5 mm, the curvature radius R4 to 4.0 mm, and the width w of the thin groove 4 to 2 mm under the conditions corresponding to an inner pressure of 690 kPa and load of 25.235 kN, assuming the contact pressure of the outer side edge of the tread center side portion 5 of the shoulder rib 3 being 100 when the width L of the annular groove 8 measured from the groove wall 4a on the tread equatorial surface side is set to 2 mm, FIG. 6 shows the change in the same contact pressure when the width L of the annular groove 8 measured from the groove wall 4a on the tread equatorial surface side is variously changed. That is, in FIG. 6, the contact pressure of the outer side edge of the tread center side portion of the shoulder rib is taken along the vertical axis, and the width L measured from the groove wall 4a is taken along the horizontal axis.

As will be noted from this drawing, when the width L exceeds 2 mm, the effect of reducing the contact pressure of the outer side edge of the tread center side portion of the shoulder rib appears, whereby the effect of suppressing progression of eccentric wear is found to be exhibited. When the width L is increased, although the effect of reducing the contact pressure of the shoulder rib appears more pronounced, when it exceeds five times the width w of the thin groove 4, the contribution to reducing the contact pressure of the shoulder rib decreases, and problems arise of cracks more easily developing, and also mold removability during manufacturing becoming worse.

From this point, it is preferable that the width L of the annular groove 8 measured from the groove wall 4a on the tread equatorial surface side be set in a range of 1 to 5 times the width w of the thin groove 4.

Also, in the pneumatic tire of this embodiment, since the depth d of the thin groove 4 is set to a range of 0.3 to 1.5 times the depth D of the circumferential direction main groove 2, and moreover the width w of the thin groove 4 is set to a range of 0.3 mm to 5.0 mm, it is possible to further increase the effect of suppressing progression of eccentric wear and the effect of preventing the occurrence of tearing and cracking.

Note that by the depth d of the thin groove 4 being less than 0.3 times, the effect of blocking eccentric wear is small, and conversely when it exceeds 1.5 times, groove bottom cracking easily occurs. Also when the width w of the thin groove 4 is less than 0.3 mm, the groove width becomes too narrow, leading to difficulty in the formation of the groove bottom with a curved surface shape and groove bottom cracking easily occurring, and when it exceeds 5.0 mm, the groove width becomes too wide, leading to the risk of eccentric wear growing.

Note that the present invention is not limited to the above-mentioned embodiment, and suitable design modifications are possible within the scope that does not depart from the spirit of the invention.

For example, in the aforementioned embodiment, the cross-sectional shape of the annular groove 8 in the tread width direction has the rounded corner portions with curvature radii R1, R2, R3, and R4 successively connected to each other. However, it is not limited thereto, and a straight portion or a curved portion having a curvature radius that differs from the curvature radii of those corner portions may be interposed between the curved corner portions.

Also, in the aforementioned embodiment, in the state of setting the curvature radii R1, R2, R3, and R4 of the corner portions of the annular groove 8 to the predetermined ranges, the width L of the annular groove 8 measured from the groove wall 4a on the tread equatorial surface side in cross section in the tread width direction is set to a range of 1 to 5 times the width W of the thin groove 4, and the depth d of the thin groove 4 is set to a range of 0.3 to 1.5 times the depth D of the circumferential direction main groove 2. However, it is not limited thereto, and the corner portions may simply be rounded without limiting the curvature radii R1, R2, R3, and R4 of the corner portions of the annular groove 8 to the predetermined ranges, with the width L of the annular groove 8 measured from the groove wall 4a on the tread equatorial surface side in cross section in the tread width direction set to a range of 1 to 5 times the width W of the thin groove 4, and the depth d of the thin groove 4 set to a range of 0.3 to 1.5 times the depth D of the circumferential direction main groove 2.

Embodiments

Examples that apply the present invention to a high performance tire for trucks and buses shall be described.

The tires shown in Table 1 were manufactured, with the tire size being 295/75R225, and the rim width being 8.25 inches.

TABLE 1

|  | w (mm) | L (mm) | d (mm) | $R_1$ (mm) | $R_2$ (mm) | $R_3$ (mm) | $R_4$ (mm) |
|---|---|---|---|---|---|---|---|
| Embodiment 1 | 2.5 | 6.0 | 16.0 | 2.0 | 2.0 | 2.0 | 8.0 |
| Embodiment 2 | 2.0 | 2.0 | 16.0 | 5.0 | 2.5 | 2.5 | 4.0 |
| Embodiment 3 | 2.0 | 2.5 | 16.0 | 2.5 | 2.5 | 2.5 | 3.0 |
| Embodiment 4 | 2.5 | 3.0 | 16.0 | 10.0 | 2.0 | 2.0 | 3.0 |

It was thus confirmed that the stone trapping resistance, tear resistance of defense grooves, and groove bottom crack resistance in all of the tires were respectively improved.

INDUSTRIAL APPLICABILITY

According to the present invention, in a pneumatic tire that provides a thin groove in the shoulder rib, because the corner portions are rounded at required locations, the stone trapping resistance improves by quickly extracting stones that have intruded into the thin groove, and since it is possible to avoid the stress concentrating at each location, the tear resistance of defense grooves and groove bottom crack resistance are respectively improved.

The invention claimed is:

1. A pneumatic tire comprising a thin groove that continuously extends in the tread circumferential direction in a shoulder rib that is demarcated to the tread edge side portion by a circumferential direction main groove that is continuous in the tread circumferential direction, the pneumatic tire comprises:
    an annular groove provided continuously in the circumferential direction in a groove wall on the tread equatorial surface side of the thin groove, which, is formed facing the normal direction of the tread surface, to be contiguous to the groove bottom, in a cross section taken in the width direction of the tread; wherein
    the shape of the annular groove in a cross section taken in the width direction of the tread is formed such that a corner portion contiguous to the groove wall on the tread equatorial surface side is rounded to a curvature radius R1, a corner portion of the innermost portion of the annular groove that is in the outer side portion in the tire radial direction is rounded to a curvature radius R2, a corner portion of the innermost portion of the annular groove that is in the inner side portion in the tire radial direction is rounded to a curvature radius R3, a corner portion contiguous to a groove wall on the tread end side is rounded to a curvature radius R4,
    the depth of the thin groove is greater than 1.0 and less than or equal to 1.5 times the depth of the circumferential direction main groove, and
    the curvature radius R1 is set to a range of 5.0 mm to 12.0 mm, the curvature radius R2 is set to a range of 1.5 mm to 4.0 mm, the curvature radius R3 is set to a range of 1.0 mm to 6.0 mm, and the curvature radius R4 is set to a range of 2.0 mm to 16.0 mm.

2. The pneumatic tire according to claim 1, further comprising a straight portion or a curved portion having a curvature radius that differs from the curvature radii of the corner portions interposed between the corner portions.

3. The pneumatic tire according to claim 2, wherein the width of the annular groove measured from the groove wall on the tread equatorial surface side in a cross section taken in the tread width direction is set to a range of 1 to 5 times the width of the thin groove.

4. The pneumatic tire according to claim 2, wherein the width of the thin groove is 0.3 mm to 5.0 mm.

5. The pneumatic tire according to claim 1, wherein the width of the annular groove measured from the groove wall on the tread equatorial surface side in a cross section taken in the tread width direction is set to a range of 1 to 5 times the width of the thin groove.

6. The pneumatic tire according to claim 1, wherein the width of the thin groove is 0.3 mm to 5.0 mm.

\* \* \* \* \*